(12) United States Patent
Sung et al.

(10) Patent No.: US 11,418,052 B2
(45) Date of Patent: Aug. 16, 2022

(54) POWER CIRCUIT AND DRIVING METHOD THEREOF

(71) Applicant: Realtek Semiconductor Corporation, Hsinchu (TW)

(72) Inventors: Ya-Hsuan Sung, Hsinchu (TW); Leaf Chen, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 316 days.

(21) Appl. No.: 16/797,057

(22) Filed: Feb. 21, 2020

(65) Prior Publication Data
US 2020/0303946 A1 Sep. 24, 2020

(30) Foreign Application Priority Data

Mar. 22, 2019 (TW) ................................ 108110144

(51) Int. Cl.
  *H02J 9/00* (2006.01)
  *H02J 9/06* (2006.01)
  *H02J 1/08* (2006.01)

(52) U.S. Cl.
  CPC .............. *H02J 9/005* (2013.01); *H02J 9/062* (2013.01); *H02J 1/08* (2013.01)

(58) Field of Classification Search
  CPC .............. H02J 1/08; H02J 9/005; H02J 9/062
  See application file for complete search history.

(56) References Cited

U.S. PATENT DOCUMENTS

| 5,959,494 A * | 9/1999 | Fotouhi | H03K 17/302 327/427 |
| 9,292,024 B2 | 3/2016 | Fujita | |
| 2015/0070087 A1* | 3/2015 | Fujita | H03K 19/0016 327/541 |
| 2019/0097631 A1* | 3/2019 | Lim | H03K 19/0008 |

FOREIGN PATENT DOCUMENTS

CN  107437933 A  12/2017

OTHER PUBLICATIONS

China Patent Office, the office action of the related Chinese application No. 201910253042.9 dated Aug. 4, 2021.

* cited by examiner

*Primary Examiner* — Terrell S Johnson
(74) *Attorney, Agent, or Firm* — Locke Lord LLP; Tim Tingkang Xia, Esq.

(57) ABSTRACT

The present disclosure relates to a power circuit including a power supply circuit and a first control circuit. The power supply circuit is electrically connected to a power supply source and a power terminal for selectively providing power to the power terminal. The first control circuit is electrically connected to the power supply circuit and configured to receive a detection signal to enable or disable the power supply circuit. When the detection signal is enabled, the first control circuit provides a first enable signal to the power supply circuit, so that the power supply circuit provides power to the power terminal. When the detection signal is at the disable level, the first control circuit is configured to provide the first disable signal to the power supply circuit, so that the power supply circuit stops providing power from the power supply source to the power terminal.

20 Claims, 6 Drawing Sheets

POWER CIRCUIT AND DRIVING METHOD THEREOF

CROSS-REFERENCE TO RELATED APPLICATION

This application claims priority to Taiwan Application Serial Number 108110144, filed Mar. 22, 2019, which is herein incorporated by reference in its entirety.

BACKGROUND

Technical Field

The present disclosure relates to a power circuit for providing power to the power terminal for power transmission.

DESCRIPTION OF RELATED ART

In various electronic devices, a connection circuit is an important component for providing power or data. There are many interface standards for connection circuits. Common specifications include universal serial bus (USB) and Lightning. When a host is connected to a device through a connection circuit, the connection circuit may need to provide power to the device. Therefore, the connection circuit needs a power circuit to determine the timing and power of the power supply.

SUMMARY

One aspect of the present disclosure is a power circuit. The power circuit includes a power supply circuit and a first control circuit. The power supply circuit is electrically connected to a power supply source and a power terminal, and configured to selectively provide power from the power supply source to the power terminal. The first control circuit is electrically connected to the power supply circuit and configured to receive a detection signal to enable or disable the power supply circuit. When the detection signal is a enable level, the first control circuit provides a first enable signal to the power supply circuit so that the power supply circuit provides power to the power terminal. When the detection signal is a disable level, the first control circuit is configured to provide a first disable signal to the power supply circuit so that the power supply circuit stops providing power to the power terminal.

Another aspect of the present disclosure is a power circuit driving method. The power circuit driving method includes the following steps. Generating a first control signal according to a power supply source by a signal generation circuit. Receiving a detection signal by a first control circuit. Providing a first enable signal to a power supply circuit according to the first control signal through the first control circuit when the detection signal is a enable level so that the power supply circuit provides power to a power terminal. Providing a first disable signal to the power supply circuit according to the power terminal through the first control circuit when the detection signal is a disable level so that the power supply circuit stops providing power to the power terminal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
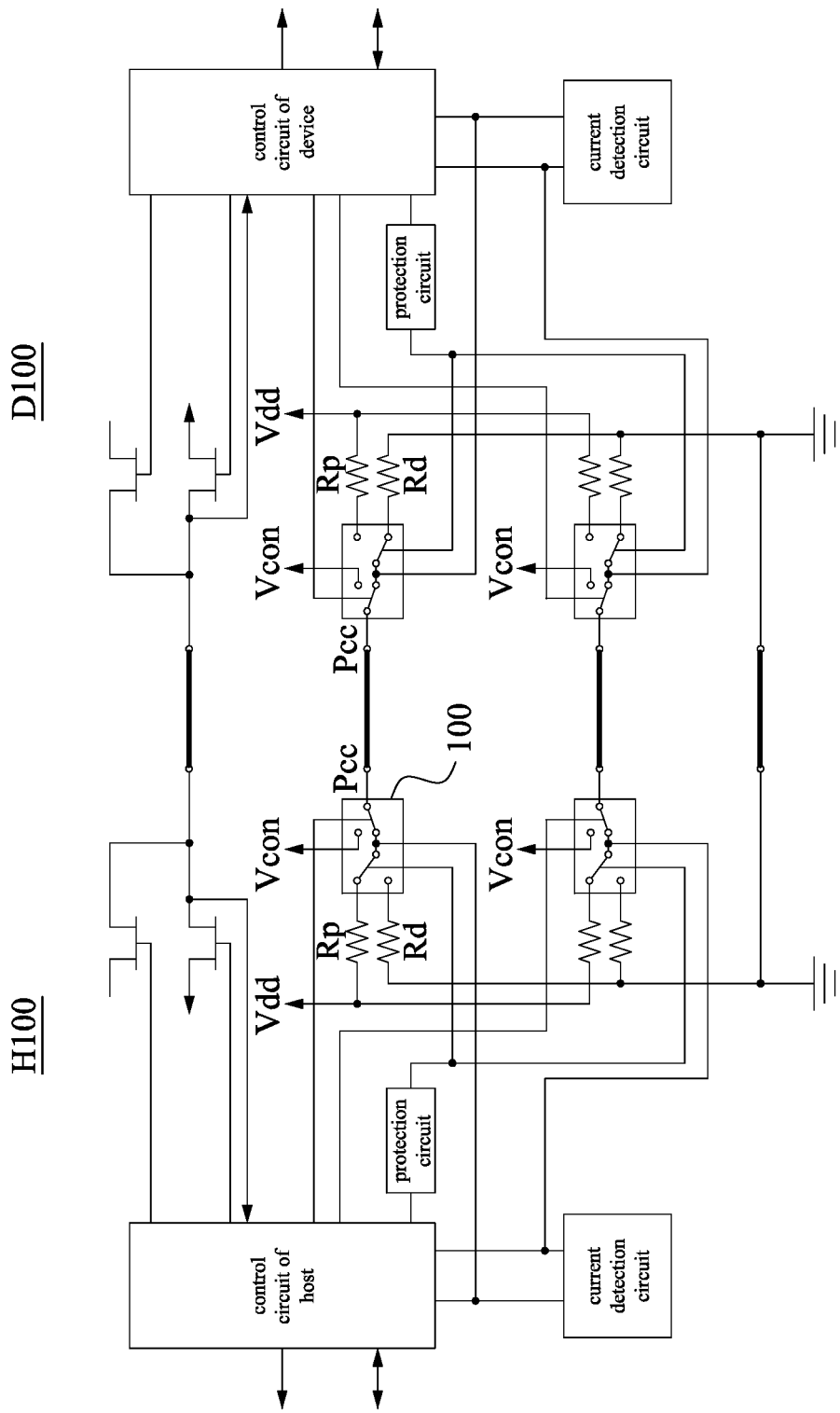
FIG. 1 is a schematic diagram of a power circuit in some embodiments of the present disclosure.

The present disclosure relates to a power circuit 100 for providing power. In some embodiments, the power circuit 100 is part of a connection circuit. Referring to FIG. 1, in some embodiments, the power circuit 100 is applied to a host H100 and a device D100, and conforms to the USB Type C transmission interface. The host H100 and the device D100 respectively include a power terminal Pcc for providing power.

In some embodiments, the power circuit 100 is configured to provide a power supply source Vcon to the power terminal Pcc. However, in some applications, since the power supply source Vcon in the device D100 sometimes may be returned to zero (e.g., "Power on reset" function), the operating voltage Vdd of the host H100 will be electrically connected to the power supply source Vcon of the device D100 through a pull-up resistor Rp and the power circuit 100 (the Vcon is zero at this time), so that the power circuit 100 is reversely conducted and a leakage problem occurs. Accordingly, one of the purposes of the present disclosure is to prevent leakage conditions.

Figure 2:
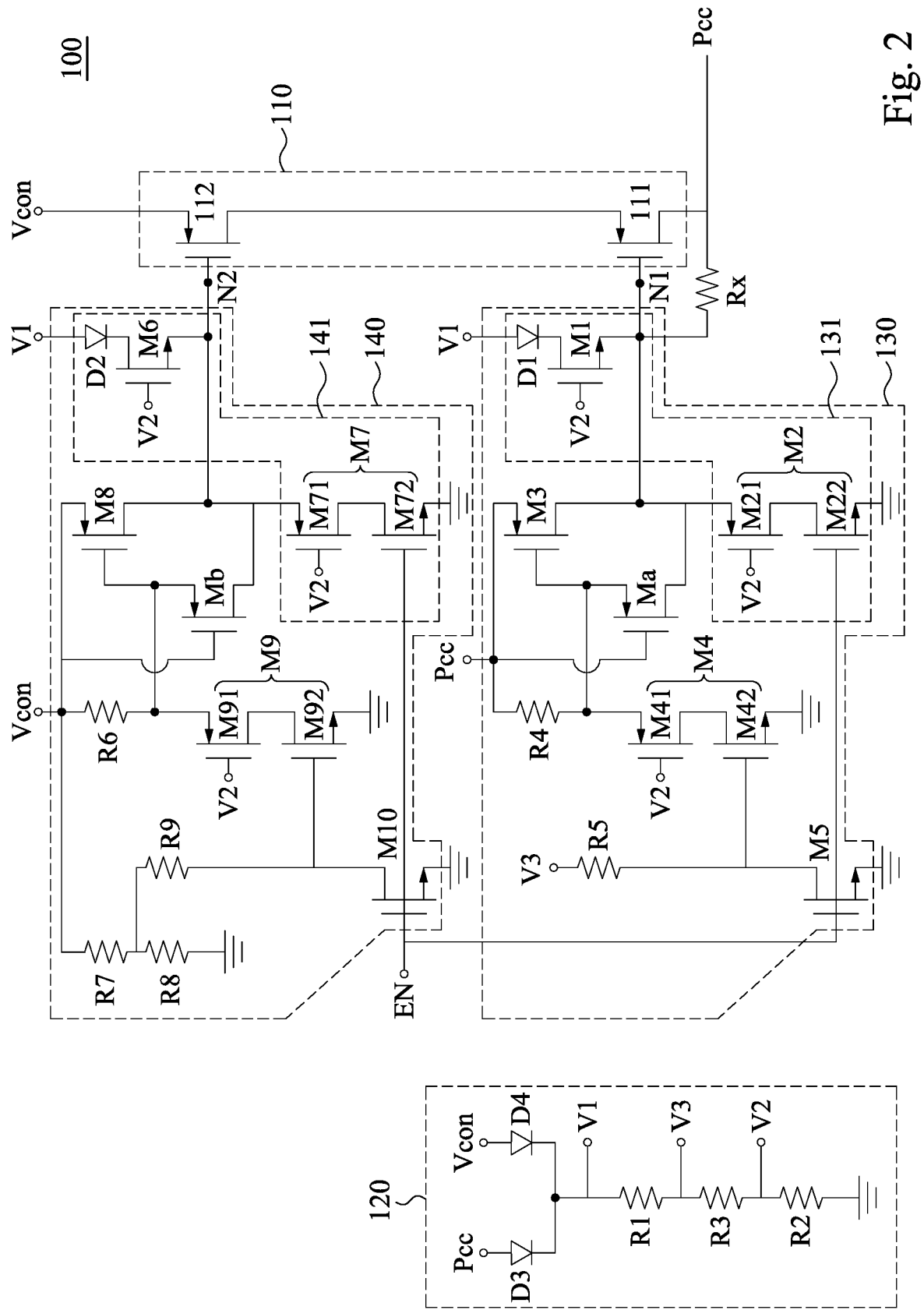
FIG. 2 is a schematic diagram of a power circuit in some embodiments of the present disclosure.

Referring to FIG. 2, the present disclosure relates to a power circuit 100 including the power supply circuit 110 and the first control circuit 130. The two terminals of the power supply circuit 110 are electrically connected to the power supply source Vcon and the power terminal Pcc. Referring to FIG. 1, the power supply circuit 110 is configured to selectively provide the power supply source Vcon to the power terminal Pcc, or provide the operating voltage Vdd to the power terminal Pcc through the pull-up resistor Rp, or couple the power terminal Pcc to ground through the pull-down resistor Rd. In normal operation, since the potential of the power supply source Vcon is greater than the potential of the power terminal Pcc, reverse conduction will not occur.

The first control circuit 130 is electrically connected to the power supply circuit 110 and is configured to receive the detection signal EN to enable or disable the power supply circuit 110. The detection signal EN is a notification signal for notifying the power supply circuit 110 to supply power. For example, when the two power terminals Pcc as shown in FIG. 1 are connected to each other, the host H100 can determine whether power is required. When the detection signal EN is an enable level, the first control circuit 130 will provide a first enable signal to the power supply circuit 110 such that the power supply circuit 110 provides the power supply source Vcon to the power terminal Pcc. When the detection signal EN is a disable level, the first control circuit 130 is configured to provide a first disable signal to the power supply circuit 110 such that the power supply circuit 110 is configured as an open circuit and stops providing the power supply source Vcon to the Power terminal Pcc. In some embodiments, the power circuit 100 is applied to the USB Type C transmission interface. That is, the power supply circuit 110 is also electrically connected to the operating voltage Vdd and the pull-up resistor Rp, but the present disclosure is not limited thereto.

In some embodiments, the power supply circuit 110 includes the first power switch 111. The power circuit 100 further includes the signal generation circuit 120. The signal generation circuit 120 is electrically connected to the power supply source Vcon and the power terminal Pcc, and generates a first control signal V1 according to the higher voltage of the power supply source Vcon and the power terminal Pcc. In some embodiments, the signal generation circuit 120 includes the first divider resistance R1, the second divider resistance R2, and the third divider resistance R3 that are electrically connected in series with each other. The divider resistances R1-R3 are electrically connected to the power supply source Vcon and the power terminal Pcc through diodes D3 and D4, respectively, so that the signal generation circuit 120 generates the first control signal V1, the second control signal V2 and the third control signal V3 according to the higher voltage of the the power supply source Vcon and the power terminal Pcc based on the voltage divider rule. The level of the first control signal V1 is greater than the level of the third control signal V3. The level of third control signal V3 is greater than the level of the second control signal V2. In some embodiments, the first control signal V1 is 4.3 volts, the second control signal V2 is 1.7 volts, the third control signal V3 is 3.3 volts, the power supply source Vcon is 5 volts, and the operating voltage Vdd is 5 volts. In order to avoid leakage, the crossover voltage of the first power switch 111 should be controlled to be less than 3.3 volts, but the present disclosure is not limited thereto. The signal generation circuit 120 can also generate control signals through other power sources, and the magnitude of the cross-voltage used to prevent the first power switch 111 depends on its component performance.

The first control circuit 130 includes the first bias circuit 131, and the first bias circuit 131 includes the first switch unit Ml. The first terminal of the first switch unit M1 is configured to receive the first control signal V1 through the diode D1. The second terminal of the first switch unit M1 is electrically connected to the control end of the first power switch 111 and the power terminal Pcc, so that when the first switch unit M1 is turned on, the first power switch 111 can be turned on according to the first control signal V1. When the first switch unit M1 is turned off, the control terminal of the first power switch 111 will receive the first disable signal, so that the first power switch 111 is turned off according to the voltage of the power terminal Pcc.

Accordingly, when the power circuit 100 has to turn off the power supply circuit 110, if the power supply source Vcon is controlled to have zero potential, since the first control circuit 130 provides the first disable signal to the first power switch 111 according to the voltage of the power terminal Pcc, the current of the power terminal Pcc cannot flow to the power supply source Vcon through the first power switch 111, and thus leakage occurs. In some embodiments, the voltage of the power terminal Pcc is less than the power supply source Vcon.

The power circuit 100 includes three application states "power state", "shutdown state", and "reset state (Power on reset)". To facilitate the description of the mthod in which the power circuit 100 controls the first power switch 111 in various states, the detailed circuit features of the first control circuit 130 are described hereinafter. As shown in FIG. 2, In some embodiments, the first bias circuit 131 further includes the second switch unit M2, the third switch unit M3, the fourth switch unit M4, the auxiliary switch Ma and the fifth switch unit M5. The first terminal of the second switch unit M2 is electrically connected to the second terminal of the first switch unit M1. The second terminal of the second switch unit M2 is electrically connected to a reference potential (e.g., ground). That is, the second switch unit M2 is connected in cascade to the first switch unit M1 on the first node N1 (the control terminal of the first power switch 111).

The first terminal of the third switch unit M3 is electrically connected to the power terminal Pcc. The second terminal of the third switch unit M3 is electrically connected to the first node N1 (the control terminal of the first power switch 111). The first terminal of the fourth switch unit M4 is electrically connected to the power terminal Pcc and the control terminal of the third switch unit M3 through a resistance R4. The second terminal of the fourth switch unit M4 is electrically connected to a reference potential, for turning on the third switch unit M3 according to the voltage of the power terminal Pcc. The first terminal of the fifth switch unit M5 receives the third control signal V3 through the resistance R5, and is electrically connected to a control terminal of the fourth switch unit M4. The second terminal of the fifth switch unit M5 is also electrically connected to the reference potential. The fifth switch unit M5 is configured to receive the detection signal EN. When the fifth switch unit M5 is turned off according to the detection signal EN, the fourth switch unit M4 will be turned on according to the second control signal V2 and the third control signal V3.

In some embodiments, the second switch unit M2 includes an N-type MOSFET M22 and a P-type MOSFET M21 connected in series. The fourth switch unit M4 includes a N-type MOSFET M42 and a P-type MOSFET M41 connected in series. In addition, the control terminal of the fifth switch unit M5 and one of the control terminals (M22) of the second switch unit M2 are controlled according to the detection signal EN. The first switch unit M1, the other control terminal (M21) of the second switch unit M2 and one of the control terminals (M41) of the fourth switch unit M4 are turned on or off according to the second control signal.

Figure 3A:
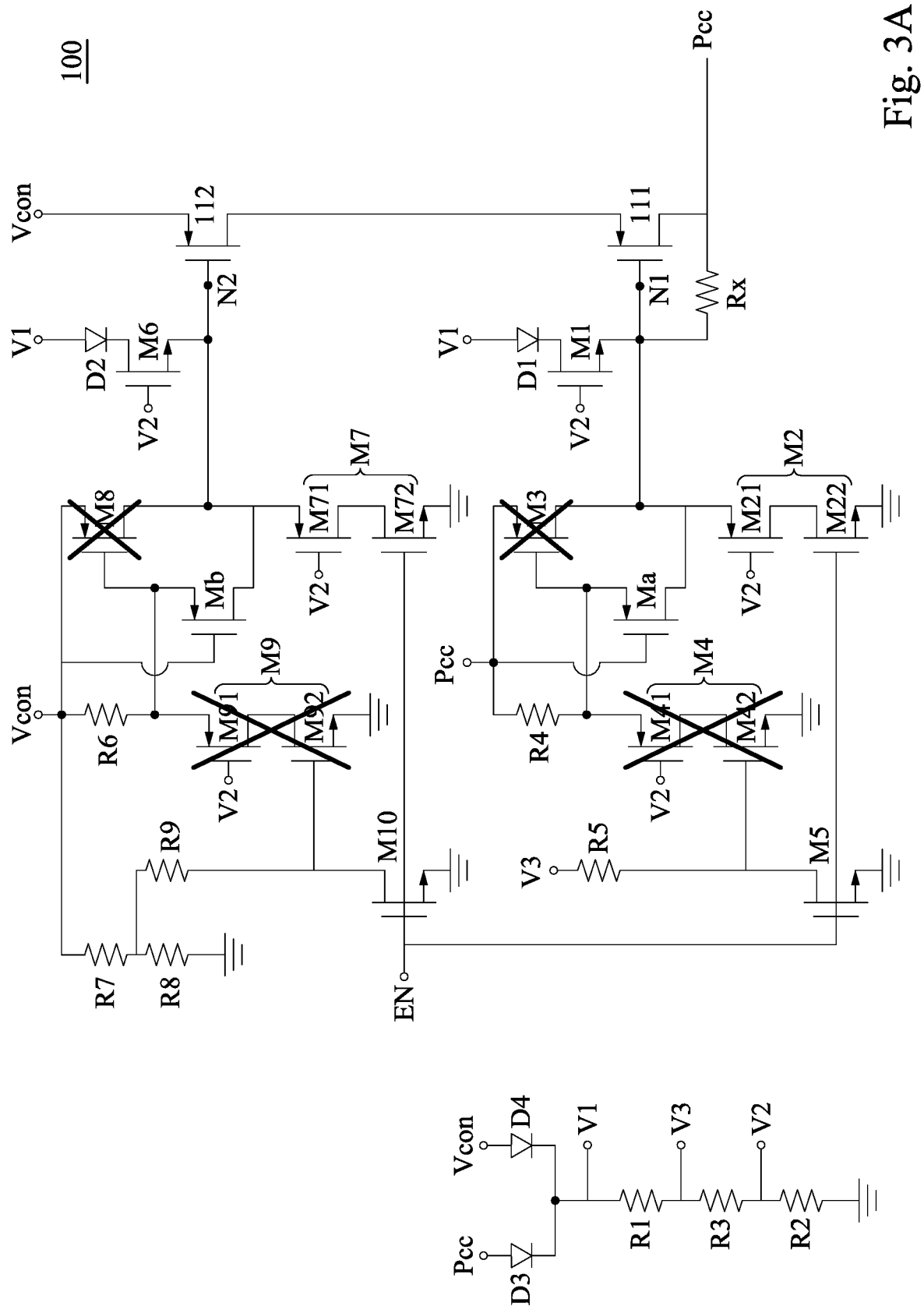
FIG. 3A is a schematic diagram of a power state of a power circuit in some embodiments of the present disclosure.

In the "power state", as shown in FIGS. 2 and 3A, the power circuit 100 controls the detection signal EN to be at the enable level (e.g., high voltage). At this time, the fifth switch unit M5 is turned on, the fourth switch unit M4 is turned off, the third switch unit M3 is turned off, and the first switch unit M1 and the second switch unit M2 are turned on. Therefore, through the first switch unit M1 and the second switch unit M2, the second control signal V2 can be operated as the first enable signal (e.g., 1.7 volts) on the first node N1 (the control terminal of the first power switch 111), so that the first power switch 111 is turned on, and the power supply source Vcon (e.g., 5 volts) is provided to the power terminal Pcc.

Figure 3B:
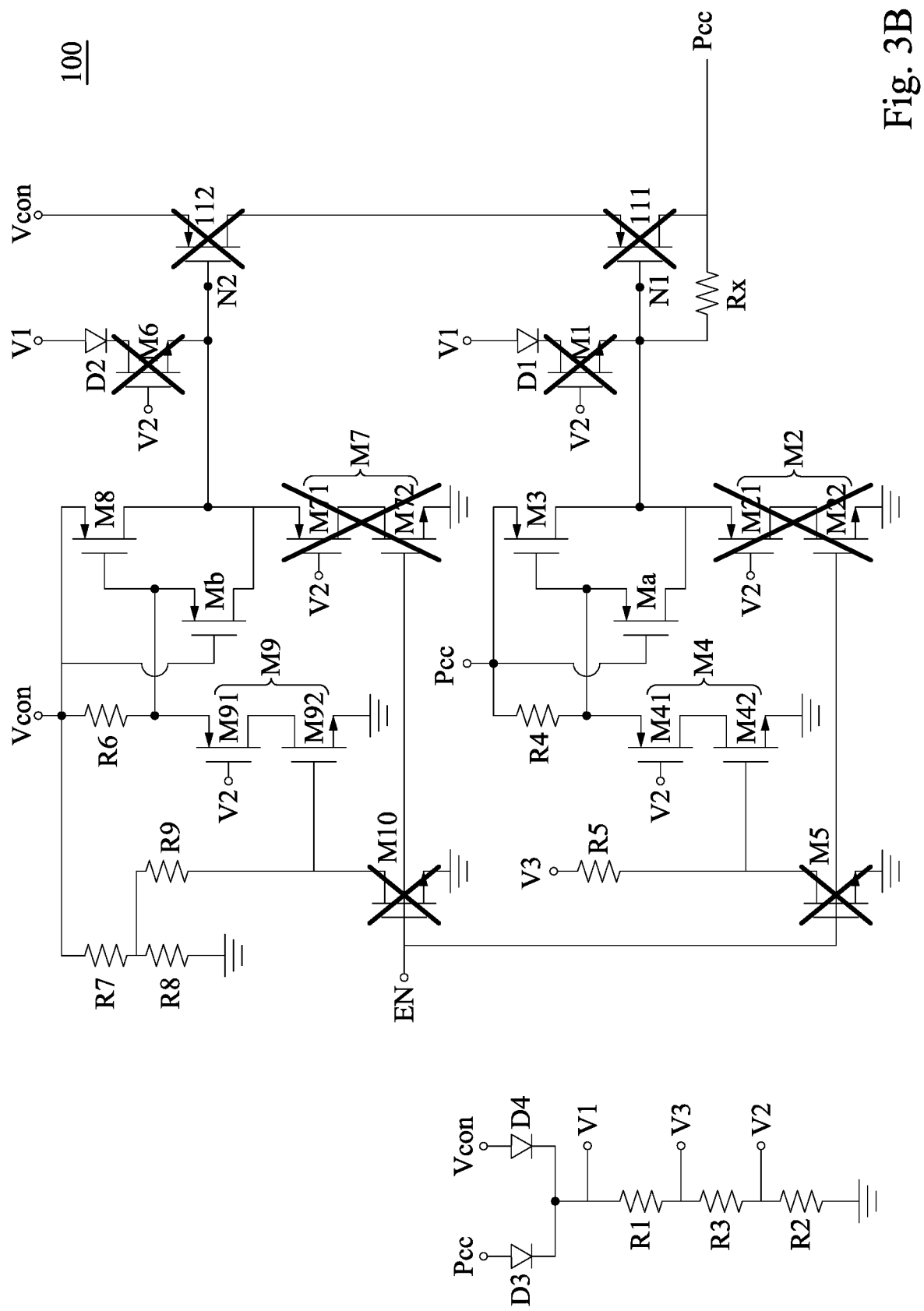
FIG. 3B is a schematic diagram of a shutdown state of a power circuit in some embodiments of the present disclosure.

In the "shutdown state", as shown in FIGS. 2 and 3B, the power circuit 100 controls the detection signal EN to be at the disable level (e.g., low voltage). At this time, the second switch unit M2 and the fifth switch unit M5 are turned off, and the third switch unit M3 and the fourth switch unit M4 are turned on. The first control circuit 130 generates the first disable signal (e.g., 3 volts) on the first node N1 (the control terminal of the first power switch 111) through the voltage of the power terminal Pcc and the third switch unit M3, to turn off the first power switch 111, so that the power supply circuit 110 stops providing the power supply source Vcon to the power terminal Pcc. In other embodiments, when the detection signal EN is at the disable level, if the voltage of the power terminal Pcc is less than the level of the second control signal V2, then in the this situation, the first power switch 111 and the first switch unit M1 may be turned on, but may still prevent the power supply circuit 110 from generating a supply current through the second control circuit 140 (described in more detail below).

Figure 3C:
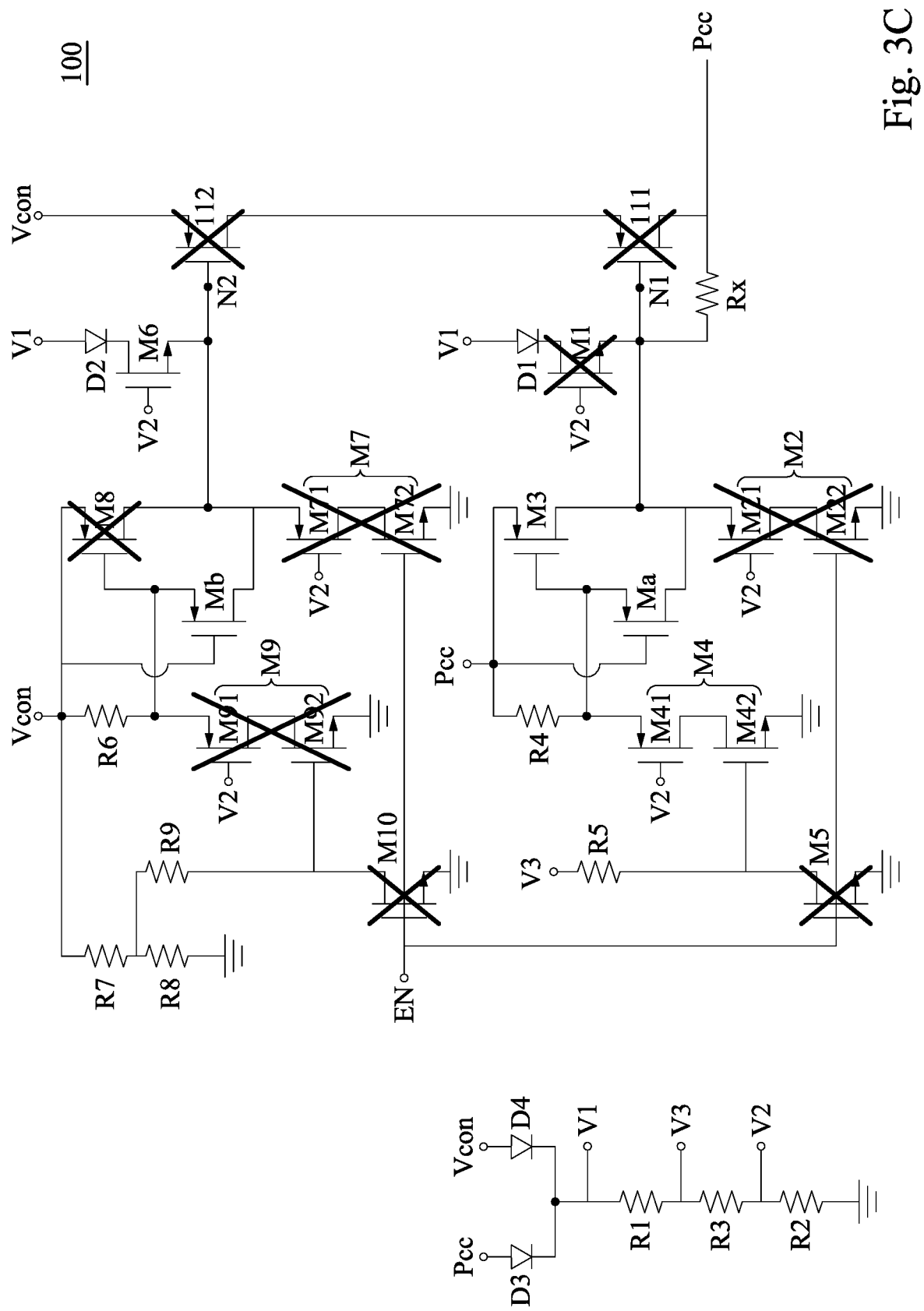
FIG. 3C is a schematic diagram of a reset state of a power circuit in some embodiments of the present disclosure.

In the "reset state", referring to FIGS. 2 and 3C, the detection signal is at the disable level (e.g., low voltage), and the power supply source Vcon is controlled to have zero potential. At this time, the state of each switch unit in the first control circuit 130 is the same as that in FIG. 3B. Since the power terminal Pcc is configured to generate the first disable signal on the first node N1 (i.e., the voltage on the power terminal Pcc), the voltage on the power terminal Pcc cannot leak through the first power switch 111.

In some embodiments, the auxiliary switch Ma is configured to prevent leakage. In the situation that the voltage value of the power terminal Pcc is zero, if the first switch unit M1 is turned on by the second control signal V2, and the first control circuit 130 does not include the auxiliary switch Ma, the first control signal V1 may be coupled to the power terminal Pcc through the first switch unit M1 and the third switch unit M3 to form a leakage path. The auxiliary switch Ma is electrically connected to the control terminal (gate) and the second terminal (drain) of the third switch unit M3. The control terminal of the auxiliary switch Ma is electrically connected to the power terminal Pcc, and is turned on according to a low potential. Therefore, when the voltage value of the power terminal Pcc is zero, the auxiliary switch Ma will be able to control the third switch unit M3 to turn off to avoid a leakage path.

Referring to FIG. 2, in some embodiments, the power circuit 100 further includes a second control circuit 140 to receive the detection signal EN to enable or disable the power supply circuit 110. The power supply circuit 110 further includes a second power switch 112. The second power switch 112 is electrically connected to the power supply source Vcon and the first power switch 111. When the detection signal EN is at the enable level, the second control circuit 140 provides a second enable signal to the second power switch 112 so that the power supply circuit 110 provides the power supply source Vcon to the power terminal. When the detection signal EN is at the disable level, the second control circuit 140 is configured to provide a second disable signal to the second power switch 112 so that the power supply circuit 110 is configured as an open circuit and the power supply circuit 110 stops providing the power supply source Vcon to the power terminal Pcc. The first power switch 111 and the second power switch 112 may be power transistors, but the present disclosure is not limited thereto.

In some embodiments, the second control circuit 140 includes a second bias circuit 141. The second bias circuit 141 includes a sixth switch unit M6. The first terminal of the switch unit M6 receives the first control signal V1 through the diode D2. The second terminal of the switch unit M6 is electrically connected to the second node N2 (the control terminal of the second power switch 112) and the power supply source Vcon. Accordingly, when the switch unit M6 is turned on, the second control circuit 140 generates the second enable signal on the second node N2 to turn on the second power switch 112, so that the power supply source Vcon is provided to the power terminal Pcc through the first power switch 111 and the second power switch 112. When the switch unit M6 is turned off, the second control circuit 140 generates the second disable signal on the second node N4 to turn off the second power switch 112.

In some embodiments, the second bias circuit 141 further includes a seventh switch unit M7. The first terminal of the seventh switch unit M7 is electrically connected to the second terminal of the switch unit M1. The second terminal of the seventh switch unit M7 is electrically connected to the reference potential. In addition, the second control circuit further includes an eighth switch unit M8, a ninth switch unit M9, an auxiliary switch Mb and a tenth switch unit M10. The first terminal of the eighth switch unit M8 is electrically connected to the power supply source Vcon. The second terminal of the eighth switch unit M8 is electrically connected to the control terminal of the second power switch 112. When the eighth switch unit M8 is turned on, the second disable signal is generated on the second node N2 according to the power supply source Vcon. The auxiliary switch Mb is electrically connected to the eighth switch unit M8, the second node N2 and the power supply source Vcon. The auxiliary switch Mb is turned on or off according to the power supply source Vcon. When the power supply source Vcon returns to zero, the switch unit M6 and the auxiliary switch Mb are turned on to generate a third disable signal on the second node N2.

The first terminal of the ninth switch unit M9 is electrically connected to the power supply source Vcon and the control terminal of the eighth switch unit M8. The second terminal of the ninth switch unit M9 is electrically connected to the reference potential. The first terminal of the tenth switch unit M10 is electrically connected to the power supply source Vcon through divider resistances R7-R9, and is configured to receive the detection signal EN. The second terminal of the tenth switch unit M10 is electrically connected to the reference potential.

In some embodiments, the seventh switch unit M7 includes an N-type MOSFET M72 and a P-type MOSFET M71 connected in series. The ninth switch unit M9 includes an N-type MOSFET M92 and a P-type MOSFET M91 that are connected in series. In addition, the control terminal of the tenth switch unit M10 and one of the control terminals (M72) of the seventh switch unit M7 are controlled according to the detection signal EN. The other control terminal (M71) of the switch unit M6 and the seventh switch unit M7 and one of the control terminals (M91) of the ninth switch unit M9 are turned on or off according to the second control signal.

In the "power state", as shown in FIGS. 2 and 3A, the power circuit 100 controls the detection signal EN to be at the enable level (e.g., high voltage). At this time, the tenth switch unit M10 is turned on, the ninth switch unit M9 is turned off, the eighth switch unit M8 is turned off, and the switch unit M6 and the seventh switch unit M7 are turned on. Therefore, the second control circuit 140 generates the second enable signal (e.g., 1.7 volts) on the second node N2 (the control terminal of the second power switch 112) according to the second control signal V2 through the second switch unit M6 and the seventh switch unit M7, so that the second power switch 112 is turned on, and the power supply source Vcon (e.g., 5 volts) is provided to the power terminal Pcc.

In the "shutdown state", as shown in FIGS. 2 and 3B, the power circuit 100 controls the detection signal EN to be at the disable level (e.g., low voltage). At this time, the seventh switch unit M7 and the tenth switch unit M10 are turned off. The eighth switch unit M8 and the ninth switch unit M9 are turned on. The sixth switch unit M6 is also turned off. The second control circuit 140 generates a disable signal (i.e., the voltage value of the power supply source Vcon) on the second node N2 (the control terminal of the second power switch 112) according to the power supply source Vcon through the eighth switch unit M8, to turn off the second power switch 112.

In the "reset state", referring to FIGS. 2 and 3C, the detection signal is the disable level (e.g., low voltage), and the power supply source Vcon is controlled to have zero potential. At this time, the seventh switch unit M7, the eighth switch unit M8, the ninth switch unit M9, and the tenth switch unit M10 are all turned off. The second control circuit 140 controls the auxiliary switch Mb to be reversely conducted with the power supply source Vcon according to the first control signal V1 through the sixth switch unit M6, so that the third disable signal is generated on the control terminal of the second power switch 112, and the power terminal Pcc cannot leak through the first power switch 111.

Figure 4:
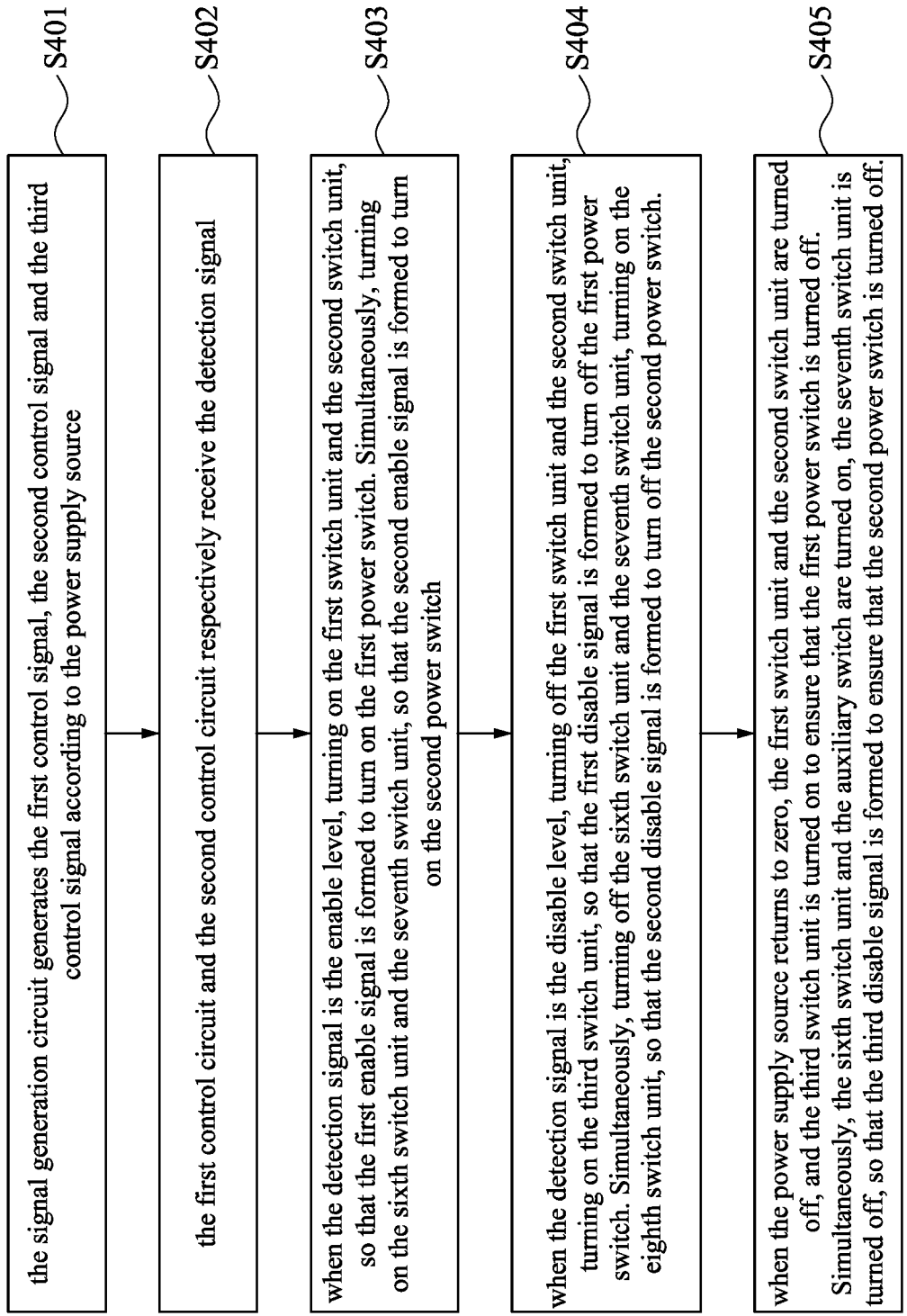
FIG. 4 is a flowchart illustrating a driving method in some embodiments of the present disclosure.

Referring to FIG. 4, the driving method of the power circuit 100 in the present disclosure will be described herein. In the step S401, the signal generation circuit 120 generates the first control signal V1, the second control signal V2 and the third control signal V3 according to the power supply source Vcon. In the step S402, the first control circuit 130 and the second control circuit 140 respectively receive the detection signal EN. In step S403, when the detection signal EN is at the enable level, turning on the first switch unit M1 and the second switch unit M2, so that the first enable signal is generated between the first switch unit M1 and the second switch unit M2 to turn on the first power switch 111. Simultaneously, the sixth switch unit M6 and the seventh switch unit M7 are turned on, so that the second enable signal is generated between the switch unit M6 and the seventh switch unit M7 to turn on the second power switch 112, and the power circuit 100 may enter into "power state".

In the step S404, when the detection signal EN is at the disable level, turning off the first switch unit M1 and the second switch unit M2, turning on the third switch unit M3, so that the power terminal Pcc forms the first disable signal on the control terminal of the first power switch 111 through the third switch unit M3 to turn off the first power switch 111, and the power supply circuit 110 stops providing the power supply source Vcon to the power terminal Pcc. Simultaneously, the sixth switch unit M6 and the seventh switch unit M7 are turned off, and the eighth switch unit M8 is turned on, so that the power supply source Vcon is operated in order to generate the second disable signal on the control terminal of the second power switch 112 through the eighth switch unit M8 to turn off the second power switch 112, and the power circuit 100 may enter into the "shutdown state".

In the step S405, when the power supply source Vcon returns to zero, the first switch unit M1 and the second switch unit M2 are turned off, and the third switch unit M3 is turned on to ensure that the first power switch 111 is turned off. Simultaneously, the sixth switch unit M6 and the auxiliary switch Mb are turned on, the seventh switch unit M7 is turned off, so that the first control signal V1 is configured as the third disable signal between the switch unit M6 and the auxiliary switch Mb to ensure that the second power switch 112 is turned off.

In some embodiments, the power circuit 100 further includes a resistance Rx. The resistance Rx is electrically connected between the control terminal and the second terminal of the first power switch 111, and the resistance Rx is a large resistance (e.g., 1 M ohm).

Accordingly, if in the reset state, the second control signal V2 and the power terminal Pcc do not immediately turn off the first switch unit M1 and the second switch unit M2, and do not turn on the third switch unit M3, the first power switch 111 may still avoid reverse conduction and avoids leakage through the resistance Rx.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:
1. A power circuit, comprising:
a power supply circuit electrically connected to a power supply source and a power terminal, and configured to selectively provide power from the power supply source to the power terminal; and
a first control circuit electrically connected to the power supply circuit and configured to receive a detection signal to enable or disable the power supply circuit, wherein when the detection signal is at an enable level, the first control circuit is configured to provide a first enable signal to the power supply circuit so that the power supply circuit provides power to the power terminal; when the detection signal is at a disable level, the first control circuit is configured to provide a first disable signal to the power supply circuit so that the power supply circuit stops providing power to the power terminal, wherein when the power supply source is controlled to have zero potential, the first control circuit is configured to provide the first disable signal to the power supply circuit according to a voltage of the power terminal.
2. The power circuit of claim 1, wherein the the power supply circuit comprises a first power switch, the first control circuit comprises a first switch unit, and when the first switch unit is turned on, the first control circuit generates the first enable signal on a first node to turn on the first power switch; when the first switch unit is turned off, the first control circuit generates the first disable signal on the first node so that the power supply circuit stops providing power to the power terminal.

3. The power circuit of claim 2, wherein the first control circuit further comprises:
a second switch unit connected in cascade to the first switch unit on the first node, wherein when the first switch unit and the second switch unit are turned on, the second switch unit is configured to generate the first enable signal on the first node.

4. The power circuit of claim 3, wherein the first control circuit further comprises a third switch unit, the third switch unit is electrically connected to the power terminal and the first node, and when the third switch unit is turned on, the third switch unit is configured to generate the first disable signal on the first node according to the power terminal.

5. The power circuit of claim 4, wherein the first control circuit further comprises a fourth switch unit, and the fourth switch unit is electrically connected to the power terminal and the third switch unit, and is configured to turn on the third switch unit according to the power terminal.

6. The power circuit of claim 5, wherein the first control circuit further comprises a fifth switch unit, and the fifth switch unit is electrically connected to the fourth switch unit, and is configured to receive the detection signal, and when the fifth switch unit is turned off according to the detection signal, the fourth switch unit is turned on.

7. The power circuit of claim 2, wherein the power supply circuit further comprises a second power switch, the power circuit further comprises a second control circuit, the second control circuit is electrically connected to the second power switch, and is configured to receive the detection signal, wherein when the detection signal is at the enable level, the second control circuit provides a second enable signal to the second power switch so that the power supply circuit provides power to the power terminal; when the detection signal is at the disable level, the second control circuit is configured to provide a second disable signal to the second power switch so that the power supply circuit stops providing power to the power terminal.

8. The power circuit of claim 7, wherein the second control circuit further comprises:
a sixth switch unit electrically connected to the second power switch, wherein when the sixth switch unit is turned on, the second control circuit is configured to generate the second enable signal on a second node to turn on the second power switch; when the sixth switch unit is turned off, the second control circuit is configured to generate the second disable signal on the second node to turn off the second power switch.

9. The power circuit of claim 8, wherein the second control circuit further comprises:
a seventh switch unit electrically connected to the sixth switch unit, wherein when the sixth switch unit and the seventh switch unit are turned on, the second control circuit is configured to generate the second enable signal on the second node.

10. The power circuit of claim 9, wherein the second control circuit further comprises:
an eighth switch unit electrically connected to the second node and the power supply source, where when the eighth switch unit is turned on, the eighth switch unit is configured to generate the second disable signal on the second node according to the power supply source.

11. The power circuit of claim 10, wherein the second control circuit further comprises an auxiliary switch, and the auxiliary switch is electrically connected to the eighth switch unit, the second node and the power supply source, wherein when the power supply source returns to zero, the sixth switch unit and the auxiliary switch are turned on to generate a third disable signal on the second node.

12. A power circuit driving method, comprising:
generating a first control signal according to a power supply source by a signal generation circuit;
receiving a detection signal by a first control circuit;
providing a first enable signal to a power supply circuit according to the first control signal through the first control circuit when the detection signal is at a enable level so that the power supply circuit provides power to a power terminal; and
providing a first disable signal to the power supply circuit according to the power terminal through the first control circuit when the detection signal is at a disable level so that the power supply circuit stops providing power to the power terminal, wherein when the power supply source is controlled to have zero potential, the first control circuit is configured to provide the first disable signal to the power supply circuit according to a voltage of the power terminal.

13. The power circuit driving method of claim 12, further comprising:
turning on a first switch unit in the first control circuit to generate the first enable signal on a first node according to the first control signal.

14. The power circuit driving method of claim 13, further comprising:
turning on a second switch unit connected in cascade to the first switch unit to generate the first enable signal on the first node when turning on the first switch unit.

15. The power circuit driving method of claim 14, further comprising:
turning off the first switch unit and the second switch unit; and
turning on a third switch unit in the first control circuit so that the first disable signal is configured to be generated on the first node through the third switch unit.

16. The power circuit driving method of claim 12, further comprising:
providing a second enable signal to the power supply circuit according to the first control signal through a second control circuit when the detection signal is at the enable level so as to turn on a second power switch in the power supply circuit; and
providing a second disable signal to the power supply circuit according to the power supply source through the second control circuit when the detection signal is at the disable level so as to turn off the second power switch in the power supply circuit.

17. The power circuit driving method of claim 16, further comprising:
turning on a sixth switch unit in the second control circuit so as to generate the second enable signal on a second node according to the first control signal.

18. The power circuit driving method of claim 17, further comprising:
turning on a seventh switch unit when turning on the sixth switch unit to generate the second enable signal on the second node.

19. The power circuit driving method of claim 18, further comprising:
turning off the sixth switch unit and the seventh switch unit; and
turning on an eighth switch unit in the second control circuit so that the power supply source is configured to generate the second disable signal on the second node through the eighth switch unit.

20. The power circuit driving method of claim 19, further comprising:

turning on the sixth switch unit and an auxiliary switch in the second control circuit, and turning off the seventh switch unit when the power supply source returns to zero, so that the first control signal generates a third disable signal on the second node to turn off the second power switch.

\* \* \* \* \*